United States Patent
Agius

(10) Patent No.: US 7,168,206 B2
(45) Date of Patent: Jan. 30, 2007

(54) HYDROPONIC APPARATUS

(75) Inventor: Joseph Agius, Cudgen (AU)

(73) Assignee: A & B Hydroponics International Pty Ltd., Cudgen (AU)

( * ) Notice: Subject to any disclaimer, the term of this patent is extended or adjusted under 35 U.S.C. 154(b) by 0 days.

(21) Appl. No.: 10/466,767

(22) PCT Filed: Jan. 31, 2002

(86) PCT No.: PCT/AU02/00097

§ 371 (c)(1),
(2), (4) Date: Aug. 1, 2003

(87) PCT Pub. No.: WO02/063945

PCT Pub. Date: Aug. 22, 2002

(65) Prior Publication Data

US 2004/0111965 A1    Jun. 17, 2004

(30) Foreign Application Priority Data

Feb. 9, 2001    (AU) .................................... PR3038

(51) Int. Cl.
*A01G 31/04*    (2006.01)
(52) U.S. Cl. .................................................... 47/62 R
(58) Field of Classification Search .............. 47/59 R, 47/60, 62 R, 62 E, 62 N, 83, 82, 86, 87, 47/39
See application file for complete search history.

(56) References Cited

U.S. PATENT DOCUMENTS

| | | | | |
|---|---|---|---|---|
| 3,254,447 A | * | 6/1966 | Ruthner | 47/65 |
| 3,339,308 A | * | 9/1967 | Clare | 47/79 |
| 3,529,379 A | * | 9/1970 | Ware | 47/17 |
| 3,667,157 A | * | 6/1972 | Longhini | 47/59 R |
| 3,909,978 A | * | 10/1975 | Fleming | 47/82 |
| 4,085,544 A | * | 4/1978 | Blake | 47/39 |
| 4,255,897 A | * | 3/1981 | Ruthner | 47/65 |

(Continued)

FOREIGN PATENT DOCUMENTS

FR    2345912 A    * 12/1977

(Continued)

OTHER PUBLICATIONS

Derwent Abstract Accession No. 93-065376/08, Class P13, SU 1722301 A1 (Bozhok) Mar. 30, 1992.

(Continued)

*Primary Examiner*—Son T. Nguyen
(74) *Attorney, Agent, or Firm*—Shoemaker and Mattare

(57) ABSTRACT

A hydroponic apparatus comprising: (a) troughs (12, 13, 14, 15, 16) linked together to form a continuous track located on guide wheel members (24, 26, 28, 30) in a support frame (32, 34), (b) a liquid supply means (36) to supply liquid to the troughs (12–16), wherein, in operation, the addition of liquid to one/some of the troughs (12–16) alters the weight distribution of the troughs (12–16) causing the track to move on the guide wheel members (24, 26, 28, 30) and thus allowing the troughs (12–16) which have become lighter as liquid is consumed by the plants and/or is lost through evaporation to move into position to be replenished with liquid. This movement is a continuous cycle according to changes in the weight distribution of the troughs (12–16) as liquid is being consumed and replenished.

7 Claims, 4 Drawing Sheets

U.S. PATENT DOCUMENTS

| | | | | |
|---|---|---|---|---|
| 5,165,364 | A | * | 11/1992 | Horkey ...................... 119/57.8 |
| 5,372,474 | A | * | 12/1994 | Miller ........................... 415/1 |
| 5,584,141 | A | * | 12/1996 | Johnson ........................ 47/65 |
| 6,394,030 | B1 | * | 5/2002 | Geiger et al. .............. 119/57.8 |
| 6,557,491 | B1 | * | 5/2003 | Weiser et al. ............. 119/57.8 |

FOREIGN PATENT DOCUMENTS

| GB | 2269304 | A | * | 2/1994 |
|---|---|---|---|---|
| SU | 1722301 | A1 | | 3/1992 |

OTHER PUBLICATIONS

International Preliminary Examination Report for PCT/AU02/00097; Apr. 30, 2002.

* cited by examiner

HYDROPONIC APPARATUS

FIELD OF THE INVENTION

This invention relates to agricultural devices in particular but not limited to a rotating hydroponic apparatus.

BACKGROUND OF THE INVENTION

Hydroponic methods of growing plants in particular food crops are well known. Problems associated with prior art hydroponic apparatus include regular replenishment of liquid and not with standing that hydroponic apparatus enable plants to be grown without soil, such apparatus often requires space and depending on the crop, hot-housed. In conditions where resources and land are expensive, for example, Japan, the added costs of building hothouses, heating, electricity, materials and labour can contribute to make the overall cost of growing crops hydroponically a prohibitively expensive exercise. There are other problems such as positioning the apparatus so that the plants receive uniform exposure to light to produce consistent yields. This can present a problem where hydroponic systems are not easy to move or are permanent fixtures.

OBJECT OF THE INVENTION

It is therefore an object of the present invention to address some of the disadvantages of prior art hydroponic apparatus or to at least provide the public with a useful choice.

STATEMENT OF THE INVENTION

According to one aspect, the invention resides in a hydroponic apparatus including in combination, a plurality of growing troughs adapted for hydroponic growing of plants;

linking means adapted to link the troughs together in substantially parallel and sequential configuration to form a continuous track;

support means adapted to support and enable movement of the track on the support means;

liquid supply means adapted to supply liquid to one or more troughs, wherein in operation, addition of liquid alters the weight distribution of the troughs causing the track to move on the support means, wherein troughs previously supplied with liquid which have become lighter as liquid is consumed by the plants and/or is lost through evaporation, are moved into position to be replenished with liquid in a continuous cycle according to changes to the weight distribution of the troughs as liquid is being consumed and replenished.

Preferably the growing troughs are elongate U-shaped or V-shaped members with a wall at either end. Troughs with a square or rectangular cross-section can also be used.

Preferably the troughs are single troughs, however, in an alternative version can be replaced by a pair (or more) of smaller troughs in juxtaposed or side by side position.

Preferably the troughs are made from PVC or other equally suitable material.

Preferably the linking means is a flexible or an articulated linkage means typically chains with connecting members adapted to connect each trough to the linking means to form a loop or continuous track.

Preferably the support means is a freely rotating set of one or more pairs of opposed guide wheel members supported in a support frame, the guide wheel members having guide means adapted to guide the linking means wherein the troughs are always suspended in a vertical position irrespective of the position of the troughs or track on the support means.

Preferably the liquid supply means is a trickle flow means which trickles liquid into the troughs as each trough passes under the trickle flow means.

Preferably the flow of liquid of the liquid supply means can be increased or decreased to control the rate at which the track moves on the support means and also determines the frequency at which liquid is replenished in each trough.

Preferably excess liquid from each trough flows into a trough located below it. In the alternative excess liquid from each trough flows into a downpipe connected to a bottom catchment trough wherein the liquid can be recycled.

Preferably the liquid is water which is added to nutrients in the troughs, however, other liquids containing dissolved nutrients can also be supplied.

Optionally, a small motor can be used to control the rate of moving the track on the support means so that the troughs can be replenished with liquid more frequently.

In another aspect, the invention resides in a method of growing plants hydroponically using the apparatus as herein described including the steps of:

planting plants in a plurality of hydroponic growing troughs linked together to form a continuous track supported on a supporting means adapted to enable movement of the track, supplying liquid to one or more of the troughs wherein the addition of liquid alters the weight distribution of the troughs causing the track to move on the support means and wherein, troughs previously supplied with liquid become lighter as liquid is consumed by the plants and/or is lost through evaporation are moved into position to be replenished with liquid in a continuous cycle according to changes to the weight distribution of the troughs as liquid is being consumed and replenished.

BRIEF DESCRIPTION OF THE DRAWINGS

In order that the invention be more readily understood and put into practical effect, reference will now be made to the accompanying illustrations wherein.

DETAILED DESCRIPTION OF THE PREFERRED EMBODIMENT

Figure 1:
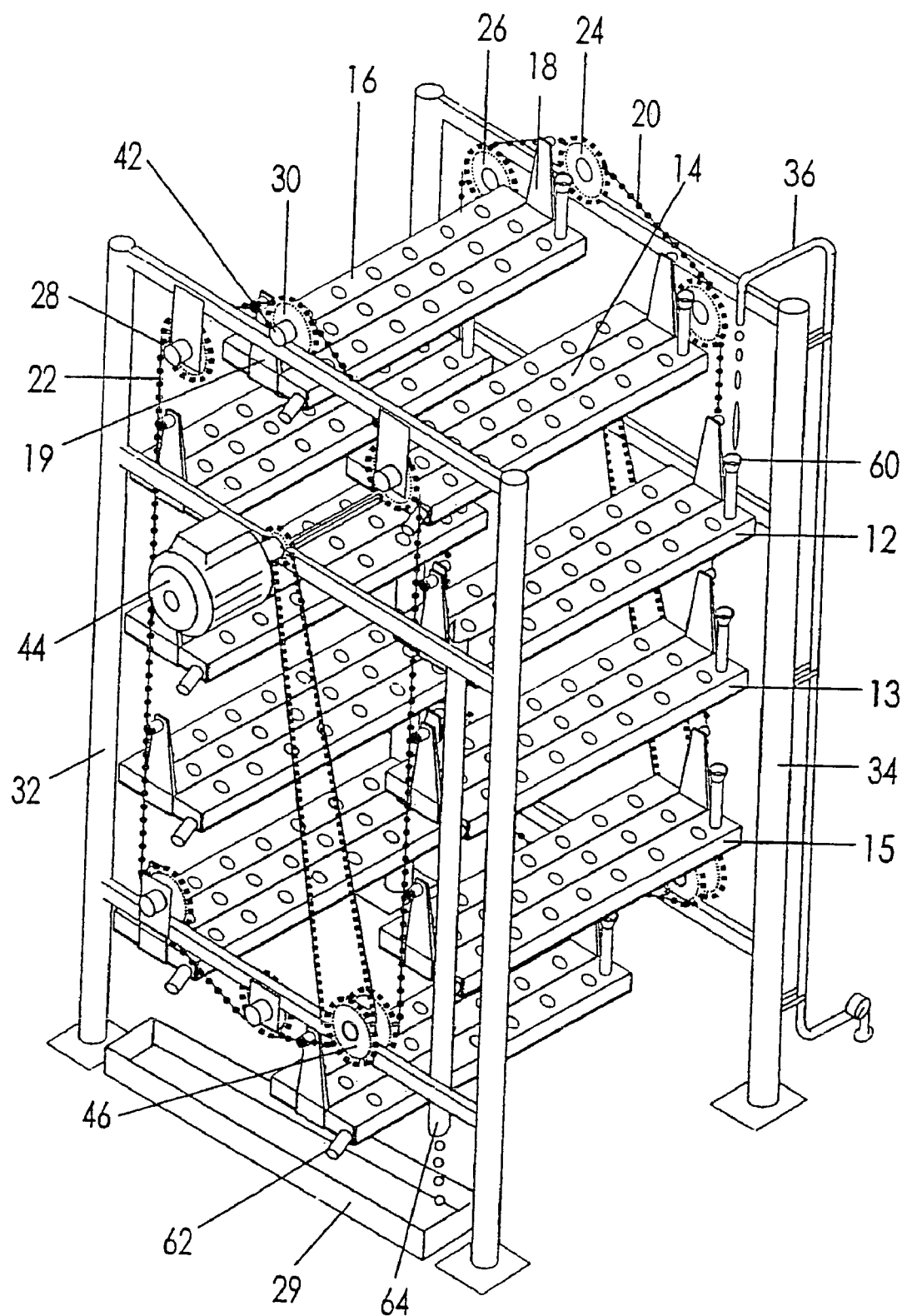
FIG. 1 is a perspective drawing of the invention according to Example 1.
Figure 1A:
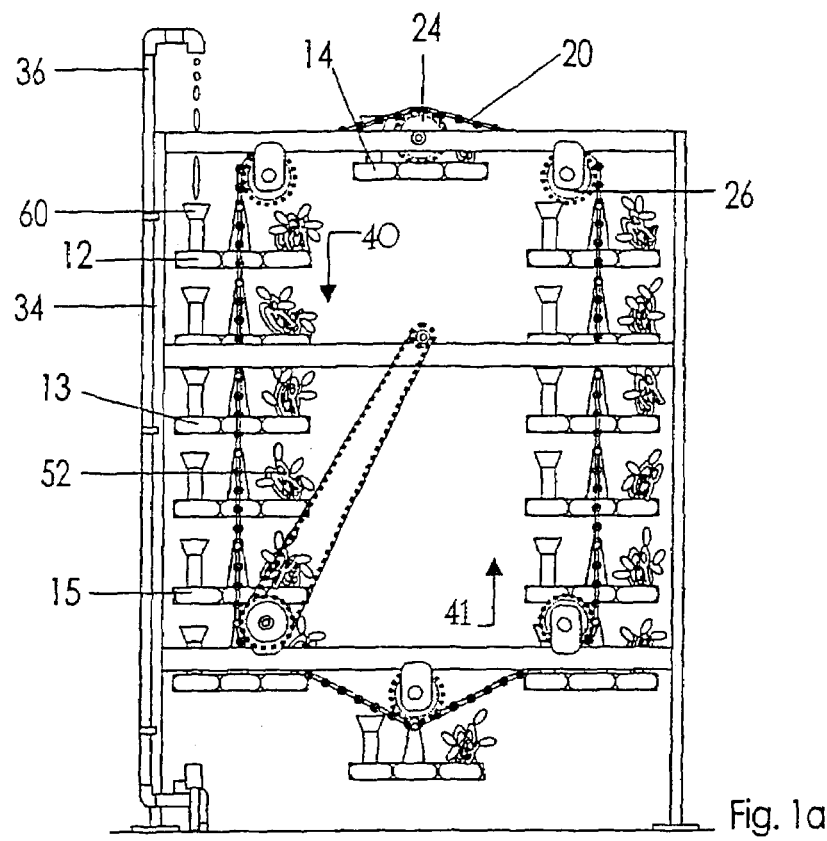
FIGS. 1a and 1c show side elevations of the invention of FIG. 1.
Figure 1C:
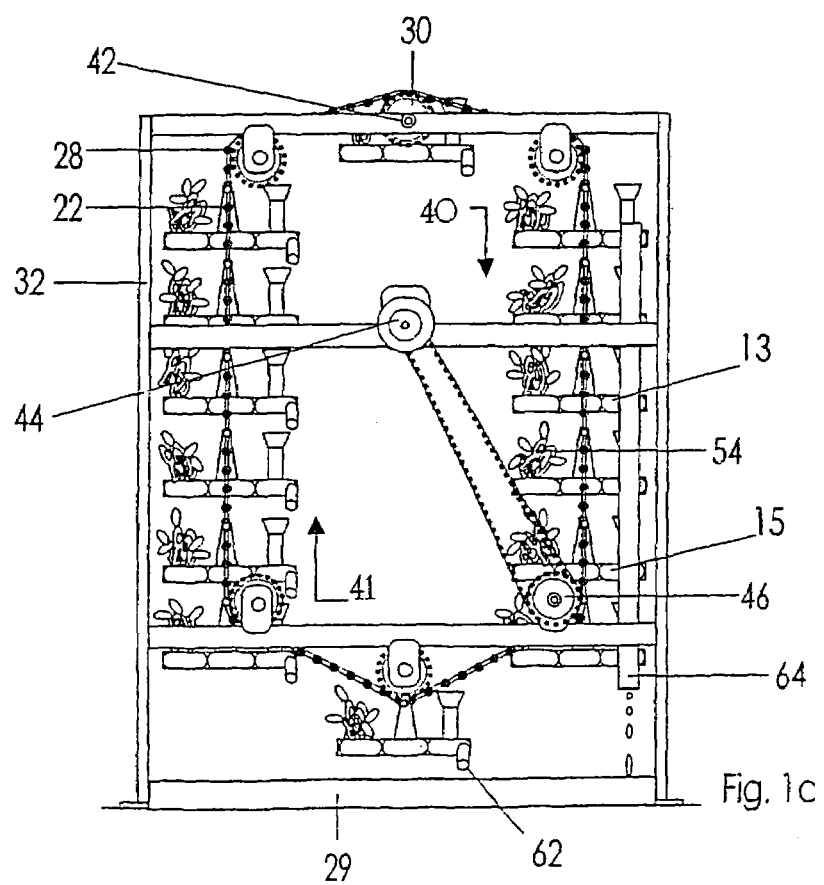
Figure 1B:
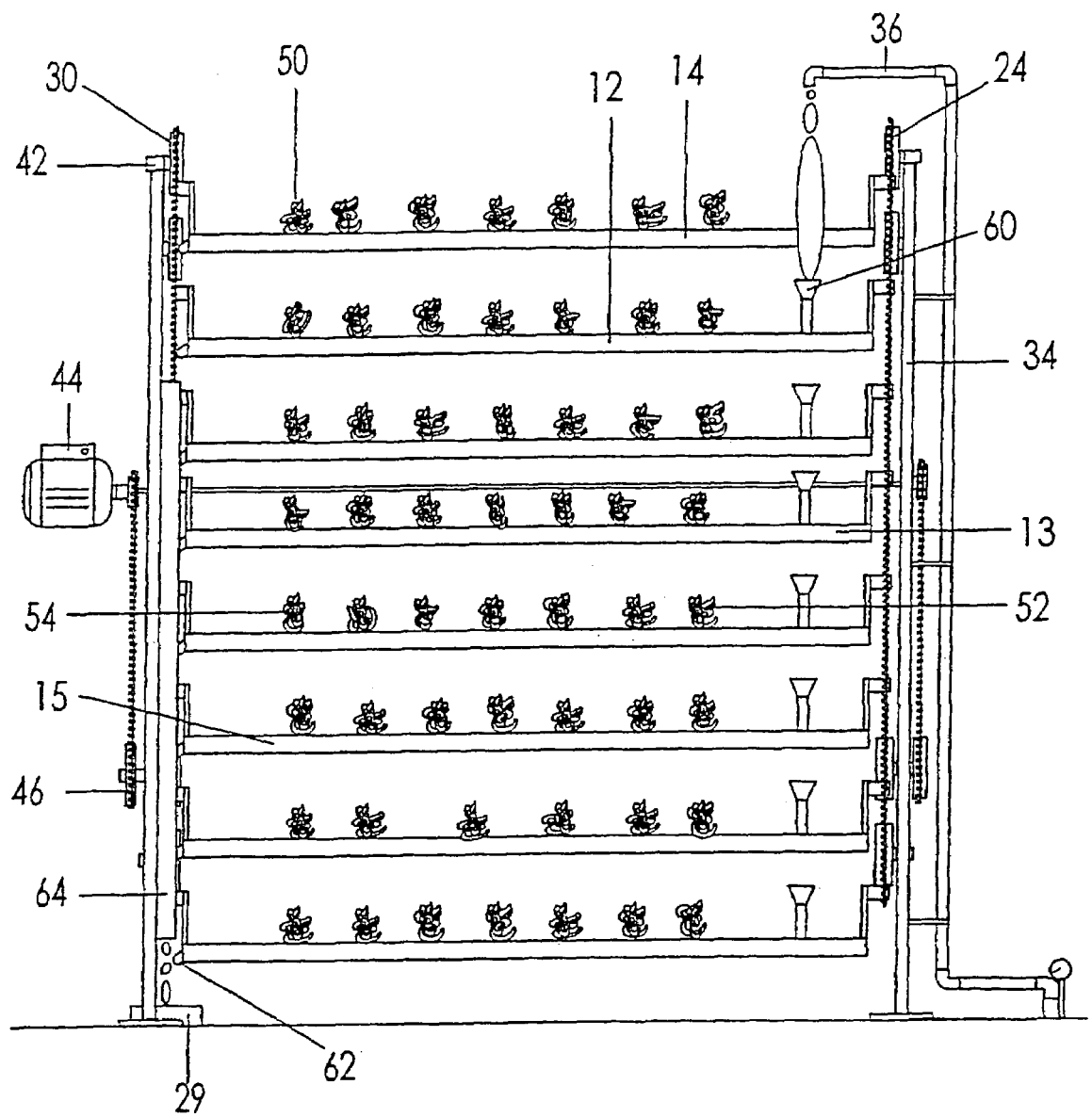
FIG. 1b shows an end elevation of the invention of FIG. 1.

FIGS. 1,1a, 1b and show perspective, side elevation and end elevation views of a preferred embodiment of the invention according to Example 1. The hydroponic apparatus 10 preferably comprises twenty troughs 12,14,16 of PVC material. Each trough is preferably four meters or six meters long and is supported at each end by aluminum, stainless steel or connecting frame members 18,19 to a pair of continuous linking chains 20,22. The troughs are spaced preferably at intervals of approximately 400 mm apart The chains and the troughs together form a continuous track which is supported by guide wheels for example shown numbered 24,26,28,30. The guide wheels are mounted in a vertical support frame 32,34 preferably of boxed steel construction. The guide wheels are suitably grooved to guide the chains as each trough passes under the liquid supply means 36 in the form of polypipe at the top of the support frame. Liquid, preferably water, flowing into trough 12 via funnel member 60 on only one side of the apparatus 10 causes the trough to descend under its own weight so that the next trough 14 is positioned under the liquid supply means.

Preferably there are outlets 62 at the bottom of each trough whereby liquid flowing along the troughs can drain into the trough below. In the alternative, liquid does not drain into the catchment trough but flows directly into a downpipe 64 connected to the catchment trough 29 wherein it can be recycled. Preferably the troughs are slightly inclined downwards from where the liquid is supplied by the polypipe 36 so that it flows along the trough before draining through each trough outlet. Preferably there is a bottom catchment trough 29 to catch excess liquid from a downpipe or liquid flowing from the trough outlets which can be recirculated. As liquid is consumed by plants 50,52,54 and/or is lost through evaporation in previously and less recently watered troughs 13,15, the imbalance in the weight distribution contributes to the rotation of the track on the guide wheels in the direction of arrows 40,41 so that each trough is replenished with water in a continuous cycle. The frequency rate at which each trough passes under. the liquid supply means is proportionally related to the flow of liquid trickling into the troughs. Guide wheels 24,26 are supported on a polished steel axle 42 which is connected to small electric motor 44 associated with a reduction gearbox assembly 46. The motor can be used to drive the guide wheels via the steel axle to cause the rotation of the track and to shorten the time before successive troughs are replenished with liquid. It will be obvious that the speed at which the track rotates on the guide wheels, and hence the rate at which the troughs are replenished with liquid, can be controlled by varying the flow of the liquid supply and/or the speed of the electric motor.

Figure 2:
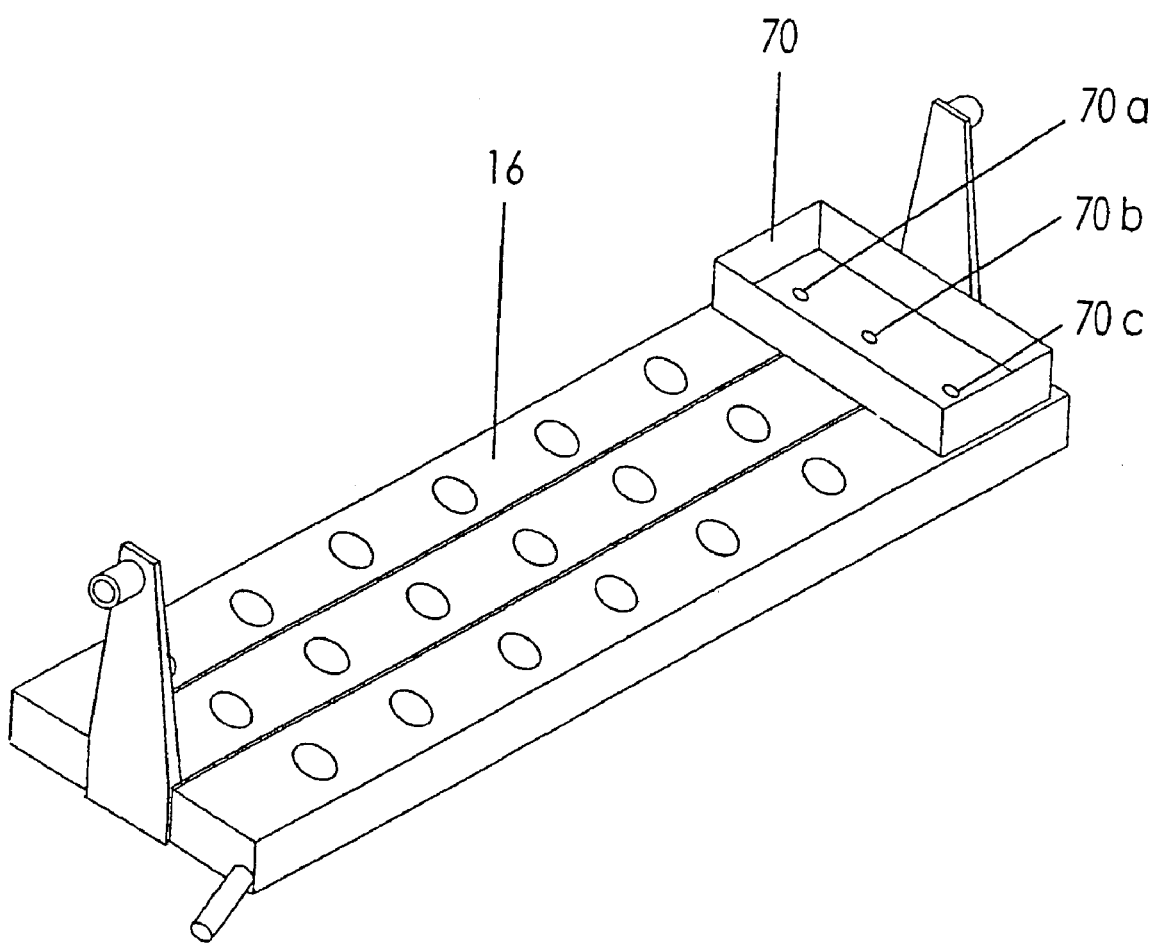
FIG. 2 shows a preferred trough assembly of the invention according to Example 2.

FIG. 2 shows detail of a preferred trough assembly according to Example 2. In place of a funnel member (60 in FIGS. 1, 1a, 1b and 1c) there is shown a drip receptacle 70 to catch liquid dripped from the liquid supply means (36 in FIG. 1).

The drip receptacle has holes 70a, 70b and 70c to allow liquid to flow into the individual trough members 16.

ADVANTAGES

The advantages of the present invention include the ability to provide yields of hydroponically grown crops far in excess of traditional hydroponic apparatus of a fixed or permanent design. The inventor who has traveled extensively has visited countries where land and resources are very expensive for example, Japan, and has discovered that the present invention can produce nine to ten times the yield of crops grown in soil by traditional methods for a given area of land. As an example, equivalent crop production from 10,016 square meters of land area under hothouse conditions can be achieved with the invention in only 848 square meters of land. This amounts to a saving of up to 91% of land costs in addition to savings with respect to electricity, heating, materials and labour normally associated with large scale hothouse production.

In summary, the benefits of the invention can be listed as follows:

Large amount of capital is saved by securing a small parcel of land, approximately $1/10^{th}$ is all that is required.

In turn, money will also be saved in building a hothouse approximately $1/10^{th}$ the size to accommodate the present invention.

Costs of electricity, heating, labour and certain material can be saved due to the reduced size of the hothouse which also allows for better management in general.

The design of the invention does not restrict the size or height of a person working with it as each rotating trough will eventually be within reach so that that person can then work in a more comfortable environment by not having to stretch too high or bend too low thereby reducing also the potential for injury and accidents.

VARIATIONS

It will of course be realised that while the foregoing has been given by way of illustrative example of this invention, all such and other modifications and variations thereto as would be apparent to persons skilled in the art are deemed to fall within the broad scope and ambit of this invention as is herein set forth.

Throughout the description and claims this specification the word "comprise" and variations of that word such as "comprises" and "comprising", are not intended to exclude other additives, components, integers or steps.

The invention claimed is:

1. A hydroponic apparatus including in combination
   a plurality of growing troughs adapted for hydroponic growing of plants,
   linking means adapted to link the troughs together in substantially parallel and sequential configuration along a continuous track,
   support means adapted to support and enable movement of the troughs on the support means, and
   liquid supply means adapted to supply liquid to one or more troughs on only one side of the apparatus, causing the troughs to move on the support means, wherein the liquid supply means is a device on only one side of the apparatus which trickles liquid into the troughs,
   each trough has a funnel for receiving liquid from said device, and
   the liquid supply device comprises a pipe having an outlet in a position such that each funnel passes directly beneath the outlet during a portion of the movement of its trough along said track so that liquid trickling from the pipe falls into said funnel.

2. A hydroponic apparatus as claimed in claim 1, further comprising connecting members each adapted to suspend a respective trough from the linking means in such a way that the troughs are always suspended in the same orientation irrespective of their position on the tracks.

3. A hydroponic apparatus as claimed in claim 1, wherein the support means comprises a frame and at least one pair of freely rotating guide wheels supported by the frame, the guide wheels supporting and guiding the linking means.

4. A hydroponic apparatus as claimed in claim 1, further comprising means for adjustably controlling the flow of liquid to the liquid supply means to control the rate at which the track moves on the support means and the frequency with which each trough is replenished with liquid.

5. A hydroponic apparatus as claimed in claim 1, wherein each trough has a drain from which excess liquid in the trough flows into a trough below it.

6. A hydroponic apparatus as claimed in claim 1, further comprising a downpipe connected to a catchment trough whereby the liquid can be recycled.

7. A hydroponic apparatus as claimed in claim 1, wherein each said receptacle is a funnel attached to a respective trough.

* * * * *